United States Patent [19]

Fasano

[11] 4,396,969

[45] Aug. 2, 1983

[54] GAS TUBE PROTECTOR MODULE

[75] Inventor: Michael Fasano, Syosset, N.Y.

[73] Assignee: Porta Systems Corp., Syosset, N.Y.

[21] Appl. No.: 325,305

[22] Filed: Nov. 27, 1981

[51] Int. Cl.$^3$ .......................... H02H 9/04; H02H 9/02

[52] U.S. Cl. ........................................ 361/124; 337/32; 337/34; 361/119

[58] Field of Search ................. 361/124, 119, 56, 120, 361/117, 118, 54, 57, 125; 337/15-20, 28-34; 313/325

[56] References Cited

U.S. PATENT DOCUMENTS

| | | | |
|---|---|---|---|
| 3,975,664 | 8/1976 | Baumbach | 361/124 |
| 4,086,648 | 4/1978 | Hines et al. | 361/124 |
| 4,314,304 | 2/1982 | Baumbach | 361/124 |
| 4,327,393 | 4/1982 | Hines et al. | 361/124 X |

*Primary Examiner*—Patrick R. Salce
*Attorney, Agent, or Firm*—Charles E. Temko

[57] ABSTRACT

An improved gas type telephone protector module in which the firing of a heat-sensitive means causes a slidably mounted ground plate to bypass in both circuits to the flow of excess current and/or voltage surges to ground. Means are incorporated to provide a secondary air gap which becomes operative upon the failure of either chamber of the gas tube.

4 Claims, 4 Drawing Figures

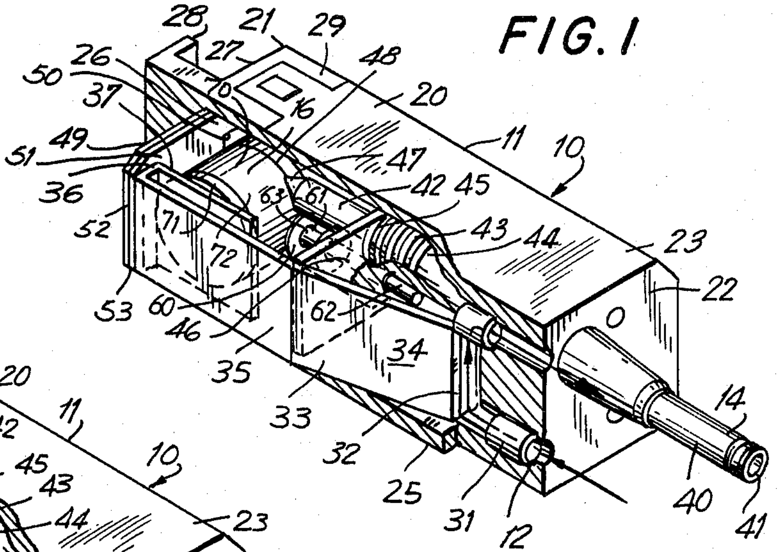
FIG. 1
FIG. 2
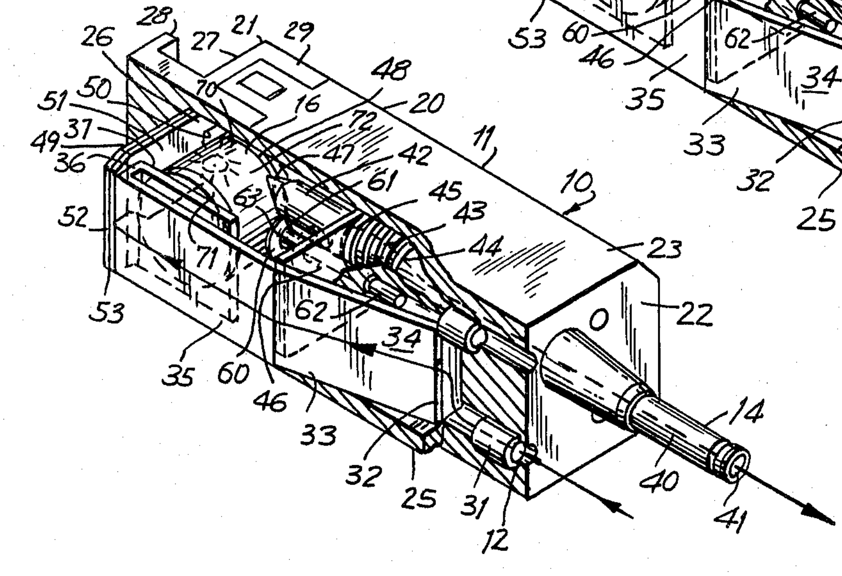
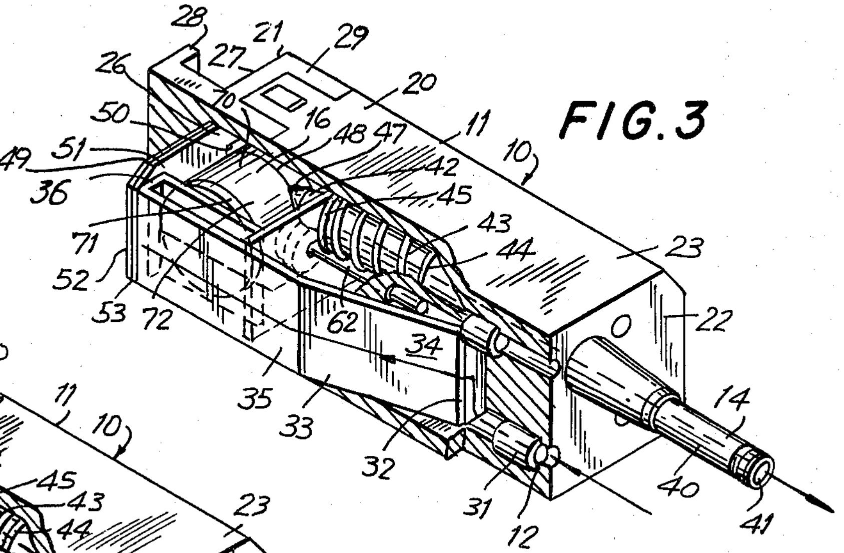
FIG. 3
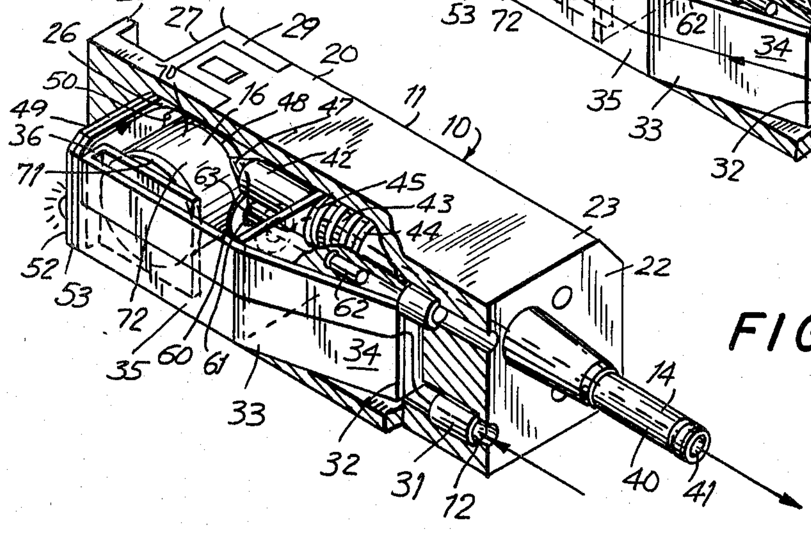
FIG. 4

GAS TUBE PROTECTOR MODULE

BACKGROUND OF THE INVENTION

This invention relates generally to the field of telephone protector modules of a type particularly adapted for the protection of individual subscriber pairs, and more particularly to one employing a known gas tube arcing device in lieu of the more commonly used carbon arc protection element.

Gas tube type protector modules are presently in common use in the art, and are constantly gaining further acceptance in the industry. Almost invariably they are provided with a heat-sensitive means which enables the gas tube to be bypassed should the current or voltage surge continue long enough to melt the fusable elements, a type of protection also often offered in the case of carbon arc type protector modules. Until the present time, little thought has been given to the provision of secondary air gap means over which momentary surges can arc should the gas tube develop gas leakage, or otherwise become inoperative. In such cases, the momentary surge is not sufficient to fire the heat-sensitive device, and where the gas tube is inoperative, no arcing takes place. In such case, upon the occurrence of momentary surges, the module does not offer protection, and sensitive equipment may be damaged. This is particularly true in the case of solid state office equipment with which most newer offices are provided.

SUMMARY OF THE INVENTION

Briefly stated, the invention contemplates the provision of an improved gas type telephone protector module, in which the above-mentioned disadvantage has been substantially eliminated. Heat-sensitive grounding is accomplished by providing a transversely extending ground plate slidably mounted on the grounding pin which moves resiliently under the firing of the heat-sensitive means to a position wherein it interconnects the tip and ring contacts directly to the grounding pin. In addition to the ground plate, a shorting plate is supported by one end of the housing, and is covered with an insulator plate having a centrally disposed orifice permitting communication between the shorting plate and the central electrode of the gas tube, the central electrode also contacting the grounding pin. The insulator plate is of slightly less effective width than the shorting plate, so that an exposed edge of the shorting plate is disposed very close to the surface of a conductive strip communicating with the tip and ring contacts. The same strip also contacts the end electrodes of the gas tube for normal operation. Should either chamber of the gas tube become inoperative, the distance between the strip and the shorting plate provides a secondary air gap over which momentary excess current and voltage surges may arc to the shorting plate, the central electrode of the gas tube and the grounding pin. Because of the minimum of parts required in the present construction, and the mutual relationship therebetween, assembly of the parts into the module housing is facilitated.

BRIEF DESCRIPTION OF THE DRAWING

In the drawing, to which reference will be made in the specification, similar reference characters have been employed to designate corresponding parts throughout the several views.

FIG. 1 is a view in perspective, partly broken away to show detail of an embodiment of the invention.

FIG. 2 is a similar view in perspective, showing an operational mode during the occurrence of momentary excess current and/or voltage surges.

FIG. 3 is a similar view in perspective, showing the relative position of the component parts after the firing of a heat-sensitive means.

FIG. 4 is a similar view in perspective, showing another mode of operation occurring upon failure of a gas tube element.

DETAILED DESCRIPTION OF THE DISCLOSED EMBODIMENT

In accordance with the invention, the device, generally indicated by reference character 10, comprises broadly: a housing element 11, a pair of tip and ring contact elements, one of which is indicated by reference character 12, a ground pin assembly 14, a heat-sensitive element 15, and a gas tube element 16.

The housing element 11 is of generally conventional construction, including a main body 20 defining a cavity, and an end cap 22 closing the end opening in the body 20. The body 20 includes an end wall 22, an upper wall 23, a pair of side walls (not shown) and a lower wall 25, the walls 22–25 defining an end opening 26 which is closed by the cap 21. The cap 21 includes a base wall 27 supporting an outwardly extending handle member 28, and interfitting components 29 which correspond to a corresponding configuration in the body 20. As the details of this construction are well known in the art, they need not be considered in further detail herein.

The tip and ring contact elements 12 are similar and symmetrical. Each includes tubular contact members 30 and 31 for the usual tip in, tip out, and ring in and ring out connections. The members 30 and 31 are interconnected by a member 32 which communicates with a generally longitudinally extending strip 33. The strip 33 includes an angularly disposed portion 34, an outer wall 35, an end wall 36 and an inner wall 37.

The ground pin assembly 14 includes an elongated ground pin 40, the outer terminal 41 of which extends outwardly of the body 20 to engage a corresponding terminal (not shown) on a protector block. A medially disposed portion 42 serves as a guide for a coiled spring 43, one end 44 of which is fixed to the portion 42, and a second end 45 of which bears upon a slidably mounted ground plate 46, the plane of which extends transversely with respect to the axis of the pin 40. An inner terminal 47 of the pin 40 bears upon a centrally disposed electrode 48 of the gas tube element 16. Disposed on an opposite side of the gas tube element 16 is a shorting plate 49 which communicates through an opening 50 in an overlying insulator plate 51 with the same central electrode 48. It will be observed that the side edges 52 of the plate 41 are not coextensive with the corresponding side edges of the shorting plate, so as to form a supplementary air gap 53 between the plate 49 and an end surface 54 of the strip 53.

The heat-sensitive element 15 is of a generally conventional type, including a solder washer 60 comprising a grommet 61 penetrating an opening in the ground plate 46. A shaft 62 penetrates the grommet and is secured by fusable solder means (not shown) in well known manner. One end 63 contacts the central electrode 48 so that the heat-sensitive means maintains the ground plate in the position shown in FIG. 1 until fired, when it assumes the second position shown in FIG. 3.

The gas tube element 16 includes a conventional gas tube 70 having a pair of outer electrodes 71 disposed on either side of the central electrode 48. Between the outer electrodes and the central electrode are a pair of gas filled chambers 72 which become conductive upon the occurrence of a predetermined voltage.

Operation of the module will be apparent from a consideration of the drawing. Normal operation is illustrated in FIG. 1, wherein normal telephone currents pass into a contact member 31 to exit through contact member 30. Should momentary current surges occur, current enters contact 31 as before, and travels down the strip 33 to an electrode 71, wherein it arcs through a gas filled chamber 72 to the central electrode 48, and thence through the pin 42, a source of ground potential.

If the surge is more than momentary in nature, the continued arcing of the tube will cause the tube to heat, the heat being transmitted through the shaft 62 to melt the solder interconnection between it and the grommet 61, allowing the spring 43 to urge the ground plate 46 leftwardly as seen in FIG. 3 until the edge portion of the plate has contacted the end edge of the inner wall 37. The excess current then bypasses the gas tube element 16 and flows directly from the strip 33 through the ground plate to the pin 40.

FIG. 4 illustrates a condition in which one of the gas filled chambers 72 does not become conductive upon the occurrence of momentary surges, either because of an initial manufacturing defect, or through the later occurrence of gas leakage. When such a condition occurs in prior art devices, no protection is afforded, and the momentary surges are transmitted directly to the office equipment. With the present construction, arcing occurs over the air gap 53, wherein the shorting plate 49 conducts the surge to the pin 40.

I with it to be understood that I do not consider the invention limited to the precise details of structure shown and set forth in this specification, for obvious modifications will occur to those skilled in the art to which the invention pertains.

I claim:

1. A gas tube type protector module for protecting a telephone circuit from excess current or voltage surges comprising: an insulative housing element, a pair of tip and ringing contact elements, a grounding pin assembly, a heat-sensitive element, and a gas tube element; said contact elements each including a pair of interconnected contact members communicating externally of said housing to a circuit to be protected, and an elongated generally longitudinally extending strip interconnected to said pair of contact members, said strip extending substantially the length of said housing to form a wall at a rearward end thereof; said grounding pin assembly including a grounding shaft, one end of which is adapted to communicate with a source of ground potential externally of said housing element, and a second end of which connects with said gas tube element, a transversely extending ground plate mounted upon a medial segment of said shaft for sliding movement therealong between first and second positions, in a second position of which said ground plate contacts a surface of said wall to establish electrical communication therewith; and resilient means urging said ground plate to said second position.

2. A module in accordance with claim 1, further comprising a shorting plate extending transversely of said shaft and supported by an end wall of said housing, and an insulator plate overlying said shorting plate, and having a centrally disposed orifice therein through which said shorting plate communicates with said gas tube element.

3. A module in accordance with claim 1, further characterized in said longitudinally extending strip forming at said second end thereof an outer wall, an end wall and an innter wall, said inner wall communicating with said gas tube element.

4. A protector module in accordance with claim 2, wherein said insulator plate is of lesser effective width than said shorting plate, to provide a secondary air gap between said shorting plate and said elongated strip.

* * * * *